US012786114B2

United States Patent
Lin et al.

(12) United States Patent
(10) Patent No.: US 12,786,114 B2
(45) Date of Patent: Nov. 3, 2026

(54) MESSAGE SENDING

(71) Applicant: New H3C Technologies Co., Ltd., Hangzhou (CN)

(72) Inventors: Changwang Lin, Beijing (CN); Hao Li, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 97 days.

(21) Appl. No.: 18/714,903

(22) PCT Filed: Jun. 28, 2022

(86) PCT No.: PCT/CN2022/101719

§ 371 (c)(1),
(2) Date: May 30, 2024

(87) PCT Pub. No.: WO2024/000136

PCT Pub. Date: Jan. 4, 2024

(65) Prior Publication Data

US 2025/0030629 A1 Jan. 23, 2025

(51) Int. Cl.
*H04L 69/04* (2022.01)
*H04L 45/00* (2022.01)
*H04L 69/22* (2022.01)

(52) U.S. Cl.
CPC .............. *H04L 45/34* (2013.01); *H04L 69/04* (2013.01); *H04L 69/22* (2013.01)

(58) Field of Classification Search
CPC ......... H04L 45/00; H04L 45/34; H04L 45/50; H04L 45/74; H04L 69/04; H04L 69/22
See application file for complete search history.

(56) References Cited

U.S. PATENT DOCUMENTS

2022/0053072 A1* 2/2022 Filsfils .................... H04L 69/04
2022/0217081 A1* 7/2022 Li ......................... H04L 45/566
(Continued)

FOREIGN PATENT DOCUMENTS

CN 113067825 7/2021
CN 113726654 11/2021
(Continued)

OTHER PUBLICATIONS

Cheng et al. "Compressed SRv6 Segment List Encoding in SRH draft-ietf-spring-srv6-srh-compression-01 .txt." *IETF*, https://datatracker.ietf.org/doc/html/draft-ietf-spring-srv6-srh-compression-01. Accessed Mar. 21, 2022.
(Continued)

*Primary Examiner* — Gil H. Lee
(74) *Attorney, Agent, or Firm* — NORTON ROSE FULBRIGHT US LLP

(57) ABSTRACT

The present disclosure provides message sending, which relates to the technical field of communication. The technical solution provided by the present disclosure includes: receiving a first message; sending a second message, wherein the second message includes a segment routing header SRH and the first message, and wherein the SRH includes a plurality of compressed segment identifier C-SID containers and segment description information, and the segment description information includes a Block length, a C-SID length and a compression type of C-SID carried by each C-SID container, so that a complete segment list can be restored offline.

13 Claims, 5 Drawing Sheets

(56) References Cited

U.S. PATENT DOCUMENTS

| | | | | |
|---|---|---|---|---|
| 2022/0286395 A1* | 9/2022 | Gandhi | H04L 45/20 | |
| 2023/0021278 A1* | 1/2023 | Filsfils | H04L 45/28 | |
| 2023/0126801 A1* | 4/2023 | Peng | H04L 45/566 | 709/238 |
| 2024/0048478 A1* | 2/2024 | Cheng | H04L 45/34 | |

FOREIGN PATENT DOCUMENTS

| | | |
|---|---|---|
| CN | 113783776 | 12/2021 |
| CN | 113824638 | 12/2021 |
| CN | 114640616 | 6/2022 |
| WO | WO 2021/211210 | 10/2021 |
| WO | WO 2022/035640 | 2/2022 |

OTHER PUBLICATIONS

Extended European Search Report issued in corresponding European Application No. 22948259.1, dated Jan. 17, 2025.

Liu, Yao et al. "SRv6 Compressed Path Recover Method; draft-pl-spring-compr-path-recover-00.txt" *IETF*, https://datatracker.ietf.org/doc/html/draft-pl-spring-compr-path-recover-00. Accessed Jun. 28, 2020.

International Search Report and Written Opinion issued in Corresponding PCT Application No. PCT /CN2022/101719, dated Mar. 17, 2023 (English Translation provided).

Office Action issued in corresponding Chinese Application No. 202280001935.4, dated Mar. 31, 2026 (English Translation provided).

* cited by examiner

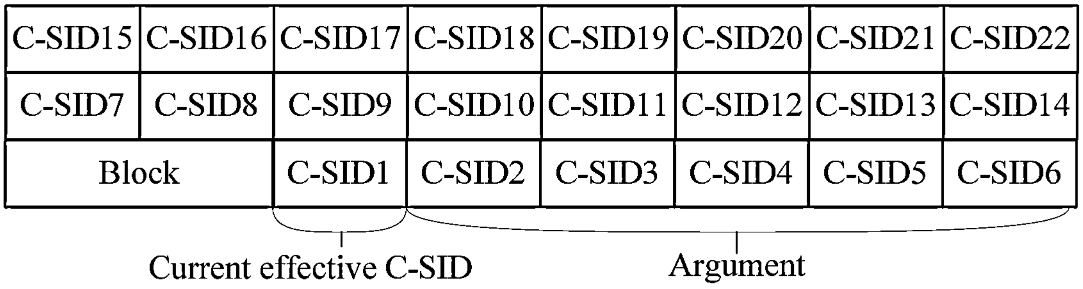
FIG. 6
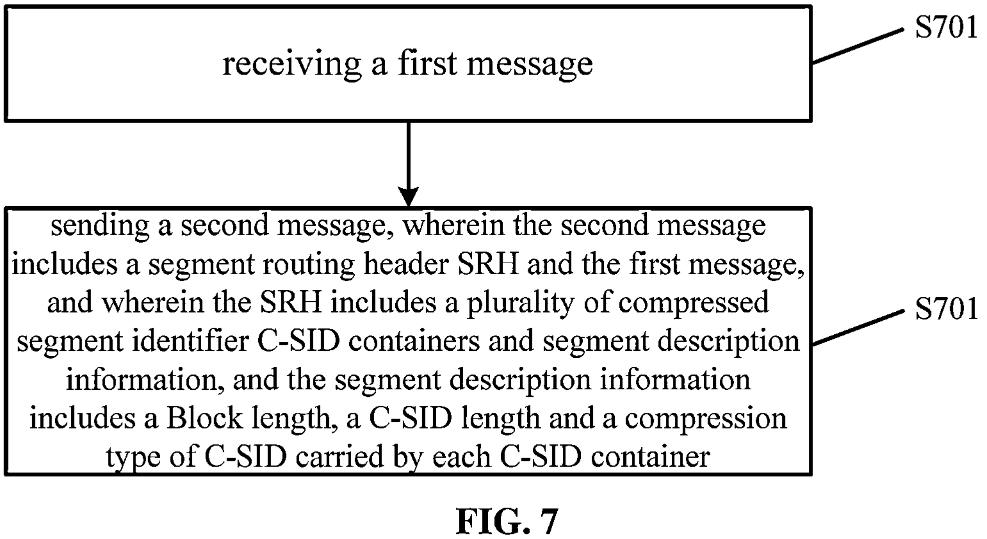
FIG. 7
| | | | |
|---|---|---|---|
| Type | Length | Des0 | Des1 |
| Des2 | Des3 | Des4 | Des5 |
| ... | DesN | | |
FIG. 8

MESSAGE SENDING

CROSS REFERENCE TO RELATED APPLICATION

The present application is a national phase application under 35 U.S.C. § 371 of International Application No. PCT/CN2022/101719, filed Jun. 28, 2022, the entire contents of which are incorporated herein by reference in their entirety.

TECHNICAL FIELD

The present disclosure relates to a field of communication technology, and in particular, to message sending.

BACKGROUND

In the Segment Routing Internet Protocol Version 6 (SRv6) network, after receiving a service message, the head node may encapsulate a Segment Routing Header (SRH) on an outer layer of the service message. The SRH includes a Segment List. Each Segment included in the segment list is a SID of a node in the forwarding path, and the length of each SID is 128 bit.

At present, in order to reduce the overhead of SRH, the Segment ID (SID) carried in SRH may be compressed. Since the SIDs in an SRv6 domain are usually assigned from the same address Block, each SID included in the segment list has a common block, and part of the optional execution Arguments (Args) included in the SID are usually 0, so these common parts may be compressed. And the part that will change in each SID, that is, part of the node ID and function ID, may be defined as a Compressed-SID (C-SID). Then, a 128-bit location occupied by one Segment in the original Segment list is to carry multiple C-SIDs, that is, the 128 bit location occupied by one segment may be used as a Compressed-SID container.

To support SRH to use C-SID, an additional behavior (usually called flavor) should be configured on the control plane for each node on the forwarding path. For example, if a flavor configured for one node is NEXT-C-SID Flavor or REPLACE-C-SID flavor, it means that the next SID in SRH is C-SID. If a node recognizes that the next SID in SRH is C-SID, it may get a complete SID based on Block, Args and the next C-SID, and then use the complete SID as a destination address of IPv6 header.

In the SRv6 network using the above compression scheme, if a network fault occurs and needs to be checked, a packet capture tool will be to capture packets. However, since the SRH does not include the flavor of each SID, the length of C-SID and the length of block, so the packet capture tool cannot restore the complete segment list based on SRH, and thus cannot troubleshoot the network failures.

SUMMARY

The purpose of examples of the present disclosure is to send messages, so as to solve the problem that the packet capture tool cannot restore a complete segment list based on SRH, and thus cannot troubleshoot network failures. Specifically, the technical solutions are as follows.

In a first aspect, an example of the present disclosure provides a method for message sending, which is applied to a network device, and the method includes:

receiving a first message;

sending a second message, wherein the second message includes a segment routing header SRH and the first message, and wherein the SRH includes a plurality of compressed segment identifier C-SID containers and segment description information, and the segment description information includes a Block length, a C-SID length and a compression type of C-SID carried by each C-SID container.

In a possible implementation, the segment description information includes container description information of each C-SID container, and each piece of container description information includes a first field, a second field and a third field;

wherein a value of the first field is to represent the compression type of the C-SID carried by the C-SID container;

a value of the second field is to represent the C-SID length;

a value of the third field is to represent the Block length of a Block or the number of C-SIDs included in the C-SID container;

when the third field is to represent the Block length of the Block included in the C-SID container, the third field is selected from multiple values, and each of the values is to represent a specified Block length.

In one possible implementation, the first field is selected from four values, which respectively represent a first compression type, a second compression type, a third compression type and a fourth compression type:

the first compression type is uncompressed;

the second compression type is compression of a NEXT-C-SID type;

the third compression type is an starting SID of a compression path of a REPLACE-C-SID type;

the fourth compression type is a non-starting SID of a compression path of a REPLACE-C-SID type or a mixed type;

wherein the mixed type is a mixed type of the NEXT-C-SID type and the REPLACE-C-SID type, and the starting SID is a complete SID of a first device on the compression path.

In one possible implementation, when the value of the second field is a first value, it indicates that the C-SID length is 16 bits;

when the value of the second field is a second value, it indicates that the C-SID length is 32 bits.

In one possible implementation, when the value of the first field represents the second compression type or the third compression type, the third field is to represent the Block length of the Block included in the C-SID container;

when the value of the first field represents the fourth compression type, the third field is to represent the number of C-SIDs included in the C-SID container.

In a possible implementation, a length of each piece of container description information is 1 byte, and 2 bits of the container description information carry the first field, 1 bit of the container description information carries the second field, 3 bits of the container description information carry the third field, and 2 bits of the container description information are a reserved field.

In a possible implementation, the SRH includes an extended TLV structure, which carries the segment description information.

In a second aspect, an example of the present disclosure provides an apparatus for message sending, which is applied to a network device, the apparatus includes:

a receiving module to receive a first message;

a sending module to send a second message, wherein the second message includes a segment routing header SRH and the first message, and wherein the SRH includes a plurality of compressed segment identifier C-SID containers and segment description information, and the segment description information includes a Block length, a C-SID length and a compression type of C-SID carried by each C-SID container.

In a possible implementation, the segment description information includes container description information of each C-SID container, and each piece of container description information includes a first field, a second field and a third field;

wherein a value of the first field is to represent the compression type of the C-SID carried by the C-SID container;

a value of the second field is to represent the C-SID length;

a value of the third field is to represent the Block length of a Block or the number of C-SIDs included in the C-SID container;

when the third field is to represent the Block length of the Block included in the C-SID container, the third field is selected from multiple values, and each of the values is to represent a specified Block length.

In one possible implementation, the first field is selected from four values, which respectively represent a first compression type, a second compression type, a third compression type and a fourth compression type:

the first compression type is uncompressed;

the second compression type is compression of a NEXT-C-SID type;

the third compression type is an starting SID of a compression path of a REPLACE-C-SID type;

the fourth compression type is a non-starting SID of a compression path of a REPLACE-C-SID type or a mixed type;

wherein the mixed type is a mixed type of the NEXT-C-SID type and the REPLACE-C-SID type, and the starting SID is a complete SID of a first device on the compression path.

In one possible implementation, when the value of the second field is a first value, it indicates that the C-SID length is 16 bits;

when the value of the second field is a second value, it indicates that the C-SID length is 32 bits.

In one possible implementation, when the value of the first field represents the second compression type or the third compression type, the third field is to represent the Block length of the Block included in the C-SID container;

when the value of the first field represents the fourth compression type, the third field is to represent the number of C-SIDs included in the C-SID container.

In a possible implementation, a length of each piece of container description information is 1 byte, and 2 bits of the container description information carry the first field, 1 bit of the container description information carries the second field, 3 bits of the container description information carry the third field, and 2 bits of the container description information are a reserved field.

In a possible implementation, the SRH includes an extended TLV structure, which carries the segment description information.

In a third aspect, an example of the present disclosure provides a network device, the network device includes:

a processor;

a transceiver;

a machine-readable storage medium storing machine-executable instructions that can be executed by the processor, wherein the machine-executable instructions cause the processor to perform the following operations:

receiving a first message by the transceiver;

sending a second message by the transceiver, wherein the second message includes a segment routing header SRH and the first message, and wherein the SRH includes a plurality of compressed segment identifier C-SID containers and segment description information, and the segment description information includes a Block length, a C-SID length and a compression type of C-SID carried by each C-SID container.

In a possible implementation, the segment description information includes container description information of each C-SID container, and each piece of container description information includes a first field, a second field and a third field;

wherein a value of the first field is to represent the compression type of the C-SID carried by the C-SID container;

a value of the second field is to represent the C-SID length;

a value of the third field is to represent the Block length of a Block or the number of C-SIDs included in the C-SID container;

when the third field is to represent the Block length of the Block included in the C-SID container, the third field is selected from multiple values, and each of the values is to represent a specified Block length.

In one possible implementation, the first field is selected from four values, which respectively represent a first compression type, a second compression type, a third compression type and a fourth compression type:

the first compression type is uncompressed;

the second compression type is compression of a NEXT-C-SID type;

the third compression type is an starting SID of a compression path of a REPLACE-C-SID type;

the fourth compression type is a non-starting SID of a compression path of a REPLACE-C-SID type or a mixed type;

wherein the mixed type is a mixed type of the NEXT-C-SID type and the REPLACE-C-SID type, and the starting SID is a complete SID of a first device on the compression path.

In one possible implementation, when the value of the second field is a first value, it indicates that the C-SID length is 16 bits;

when the value of the second field is a second value, it indicates that the C-SID length is 32 bits.

In one possible implementation, when the value of the first field represents the second compression type or the third compression type, the third field is to represent the Block length of the Block included in the C-SID container;

when the value of the first field represents the fourth compression type, the third field is to represent the number of C-SIDs included in the C-SID container.

In a possible implementation, a length of each piece of container description information is 1 byte, and 2 bits of the container description information carry the first field, 1 bit of the container description information carries the second field, 3 bits of the container description information carry the third field, and 2 bits of the container description information are a reserved field.

In a possible implementation, the SRH includes an extended TLV structure, which carries the segment description information.

In a fourth aspect, an example of the present disclosure provides a machine-readable storage medium having stored therein machine-executable instructions, which, when called and executed by a processor, cause the processor to: implement the method described in the first aspect above.

In a fifth aspect, an example of the present disclosure provides a computer program product that causes the processor to: implement the method described in the first aspect above.

With the above technical solution, after receiving the first message, the network device may send the second message including SRH and the first message. The SRH includes a plurality of C-SIDs and segment description information. Since the segment description information includes the common Block length and the compression type of the C-SID carried by each C-SID container, the packet capture tool may obtain the information needed to restore each SID in the segment list from the SRH, and then restore the complete segment list based on the SRH, and troubleshoot the network failures.

BRIEF DESCRIPTION OF DRAWINGS

In order to more clearly describe the technical solutions of the examples of the present disclosure or of the prior art, drawings that need to be used in examples and the prior art will be briefly described below. Obviously, the drawings provided below are for only some examples of the present disclosure; those skilled in the art may also obtain other drawings based on these drawings.

FIG. 6 is a schematic diagram of a mixed-type C-SID compression provided by an example of the present disclosure;

FIG. 7 is a flowchart of a method for message sending provided by an example of the present disclosure;

FIG. 8 is a schematic structural diagram of a TLV carrying segment description information provided by an example of the present disclosure;

DETAILED DESCRIPTION

In order to make the objectives, technical solutions, and advantages of the present disclosure clearer and more understandable, the present disclosure will be described in more detail below with reference to the appended drawings and examples. Obviously, the described examples are only some, and not all, of the examples of the present disclosure. All other examples obtained based on the examples of the present disclosure by those skilled in the art fall into the scope of protection defined by the present disclosure.

For the convenience of description, the following related concepts related to the examples of the present disclosure are explained.

SRv6 is a source routing technology. The head node of SRv6 network may add SRH encapsulation to the traffic, and guide the traffic to be forwarded according to the specified path through the Segment List in the SRH header.

Figure 1:
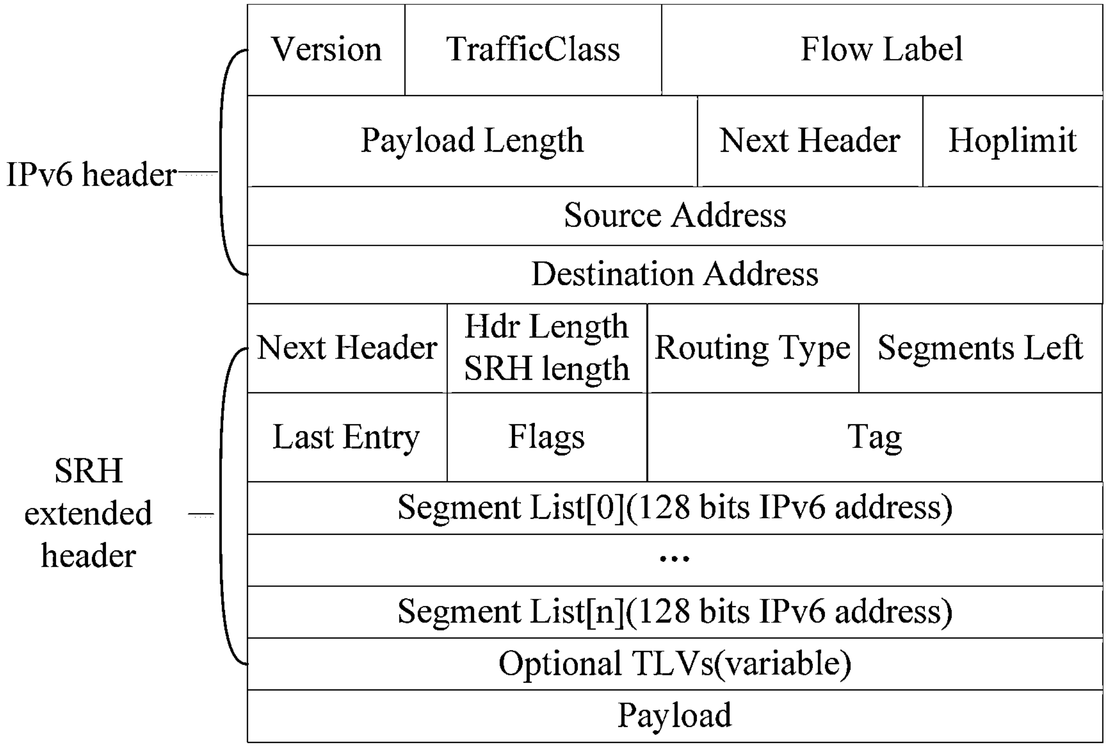
FIG. 1 is an IPV6 message format provided by an example of the present disclosure.

FIG. 1 shows the format of IPV6 message in SRv6 network. As shown in FIG. 1, IPv6 message is mainly composed of IPV6 header, SRH and Payload.

The IPv6 header includes:

Version, with a length of 4 bits, indicates the version of the IP protocol;

TrafficClass, with a length of 8 bits, indicates the type or priority of data flow communication;

Flow Label, with a length of 20 bits;

Payload Length, with a length of 16 bits, indicates the sum of IPV6 extended header and application data length, excluding the fixed header length;

Next Header, with a length of 8 bits, is to identify the type of the next header. A value of 43 indicates that the next header is SRH;

Hoplimit, with a length of 8 bits;

Source Address, with a length of 128 bits, is the IP address of the source end;

Destination Address, with a length of 128 bits, is the IP address of the destination end.

SRH includes:

Next Header, with a length of 8 bits, is to identify the type of the next header;

SRH length (Hdr Ext Len), with a length of 8 bits, indicates the length of SRH header in units of 8 bytes, excluding the first 8 bytes;

Routing Type, with a length of 8 bits and a value of 4, indicates that SRH is carried;

Segments Left (SL), with a length of 8 bits, is the number of the next segment list to be processed;

Last Entry, with a length of 8 bits, its value is the number of the first SID of the actual forwarding path of the message in the SRH header;

Flags, with a length of 8 bits, are flag bit information;

Tag, with a length of 16 bits, is to tag a group of messages with the same characteristics.

Segment List, is a list of SIDs, is arranged in the order of nodes on the message forwarding path from far to near, that is, Segment List [0] indicates the last SID of the path, Segment List [1] indicates the penultimate SID of the path, and so on. Each SID may be an IPV6 address of 128 bits.

Optional Type Length Values (Optional TLVs) are extended fields that carry variable data, such as encryption and authentication information.

The SID shown in FIG. 1 is an uncompressed IPv6 address with a length of 128 bits, occupying 4 bytes. When SRv6 is applied to the Best Effort (BE) scenario or Traffic Engineering (TE) scenario, the hop count of the forwarding path is less than 5, and the length of SRH is controllable. However, if SRv6 is applied in the TE or service chain scenario of large-scale network, the hop count of forwarding path will be very large, and SRH includes a large number of IPV6 addresses with 128 bits, which may bring the following problems: high overhead and low carrying efficiency; the excessively long Segmet list causes difficulties for hardware forwarding, and the hardware forwarding layer cannot read the complete Segmet list at one time, so it needs to read it many times, which reduces the forwarding efficiency, and the message length may exceed MTU, so the head node needs to transmit the message in pieces, which leads to the performance degradation of the head node.

With the continuous development and enrichment of network services, the number of SIDs will gradually increase in the future, and the overhead of SRv6 header will become the challenge of SRv6 deployment. In order to solve this problem, SID compression becomes an inevitable choice.

Figure 2A:
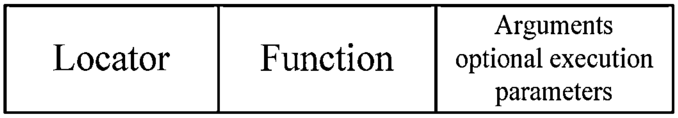
FIG. 2*a* is a schematic structural diagram of a SID provided by an example of the present disclosure.

As shown in FIG. 2*a*, which is a schematic diagram of SID. SID is mainly composed of the following three parts:

Locator, which is the ID of the network node indicated by this SID;

Function, which indicates the forwarding action of the network node;

Arguments, which are optional execution parameters, usually 0.

Figure 2B:
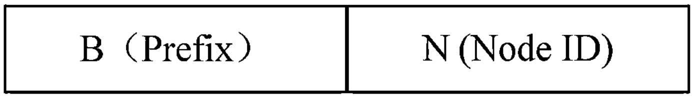
FIG. 2*b* is a schematic structural diagram of a Locator provided by an example of the present disclosure.

As shown in FIG. 2*b*, the Locator in FIG. 2*a* may be further subdivided into B and N; B represents SRv6 SID Block, which is generally a subnet segment allocated by the network operator, and may also be represented by Prefix; N is a Node ID that distinguishes nodes in a subnet. According to the definition of message header format of SRv6, the largest part of message header is Segment list. With the same number of entries, the header compression of SRv6 is actually the compression of a single SID.

In SRv6 network, the SIDs included in the same SID list are usually assigned from one address block and have the same prefix, so the prefixes of all SIDs in the same SID list are the same, that is, all SIDs in the same SID list have the same Common Prefix; The Argument of SID is usually 0, so the only parts that change in SID are the N and Function, and the rest is the same.

Figure 3:
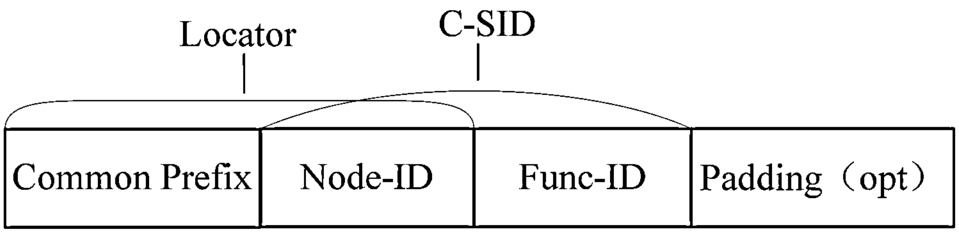
FIG. 3 is a schematic structural diagram of another SID provided by an example of the present disclosure.

As shown in FIG. 3, at present, the compression way of SID mainly defines N and Function parts as C-SID, and C-SID includes the variable parts Node ID and Func-ID in the above SID; a complete SID of 128 bits may be obtained by splicing C-SID, Common Prefix and possible Padding; the original SID length is 128 bits, and the compressed C-SID length is less than 128 bits. Therefore, the location of one Segment in the Segment List of SRH may accommodate multiple C-SIDs, and the location of one Segment may be called a compressed C-SID container (Compressed-SID container), and one C-SID container may accommodate multiple C-SIDs.

The length of one C-SID container is 128 bit, which may accommodate a complete SRv6 SID, or can accommodate multiple C-SIDs.

At present, there are three types of compression of Segment List, namely, NEXT-C-SID type, REPLACE-C-SID type and the mixed type of NEXT-C-SID and REPLACE-C-SID. Accordingly, two Flavors (additional behaviors) of SRv6 SID are defined, namely, NEXT-C-SID and REPLACE-C-SID. If the locally configured flavor is NEXT-C-SID, it means that the SID of the next node in the Segment List is the compression of NEXT-C-SID type; if the locally configured flavor is REPLACE-C-SID, it means that the SID of the next node in the Segment List is compression of REPLACE-C-SID type.

The following three types of compression are introduced respectively.

1. Next-C-SID

Figure 4A:
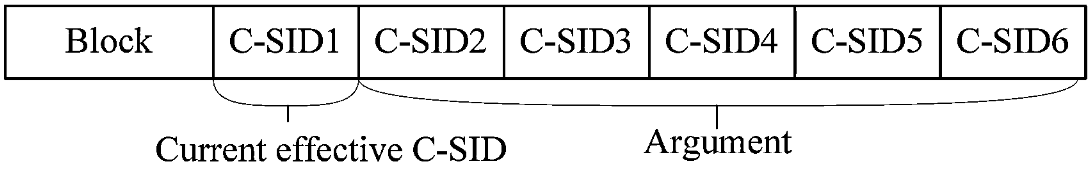
FIG. 4*a* is a schematic diagram of C-SID compression of a Next-C-SID type provided by an example of the present disclosure.

As shown in FIG. 4*a*, FIG. 4*a* is an exemplary diagram of one C-SID container of the Next-C-SID type. In FIG. 4*a*, one C-SID container may accommodate one 32 bit Block and six 16 bit C-SIDs. The content carried by one C-SID container may be regarded as a complete IPv6 address, with the C-SID after the Block as the current effective C-SID and the remaining C-SIDs as the Argument of the IPV6 address.

Figure 4B:
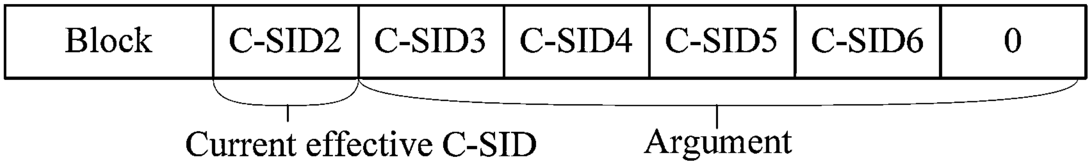
FIG. 4*b* is a schematic diagram of C-SID compression of another Next-C-SID type provided by an example of the present disclosure.

In FIG. 4*a*, when the message is forwarded to node 1 indicated by C-SID1, node 1 determines that the locally configured Flavor is NEXT-C-SID Flavor, and the Argument field of the destination address is not all zero, so the Argument field is shifted to the left by one C-SID length, and the lowest 16 bit are filled with 0. At this time, the content carried by the C-SID container is shown in FIG. 4*b*, and the current effective C-SID is C-SID2. Node 1 will copy the content carried by the C-SID container indicated by SL to the destination address of IPV6 header of the message, and forward the message to node 2 indicated by C-SID2.

After receiving the message, the node indicated by the node 2 will also shift the C-SID container according to the NEXT-C-SID Flavor configured by the control plane, and fill the lowest 16 bit with 0, then copy the content carried by the C-SID container to the destination address of the message and continue forwarding.

Figure 4C:
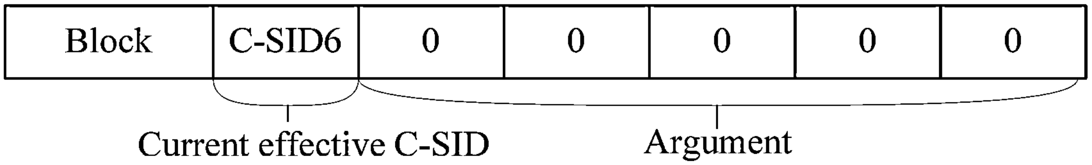
FIG. 4*c* is a schematic diagram of C-SID compression of another Next-C-SID type provided by an example of the present disclosure.

When the message is forwarded to node 6 corresponding to the C-SID6, the content carried by the C-SID container and the destination address in the IPV6 header of the message are shown in FIG. 4*c*. At this time, the Argument fields are all 0, so node 6 needs to decrement SL in the SRH by 1 and forward it according to the Segment indicated by SL-1.

2. REPLACE-C-SID

Figure 5A:
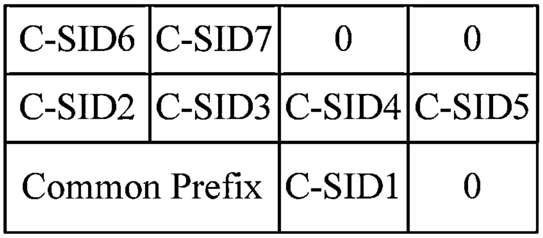
FIG. 5*a* is a schematic diagram of C-SID compression of a REPLACE-C-SID type provided by an example of the present disclosure.

As shown in FIG. 5*a*, FIG. 5*a* is an exemplary diagram of one C-SID container of the REPLACE-C-SID type. A compression path of the REPLACE-C-SID type needs a 128 bit SRv6 SID as a boot SID, which carries the Common Prefix of this compression path. Subsequent SIDs on this compression path are all C-SIDs, and the last row (Common Prefix, C-SID1 and 0) in FIG. 5*a* is the boot SID, and C-SID 2 to SID 7 of subsequent compression paths share the Common Prefix of the boot SID.

It should be noted that all SIDs included in one Segment List may have the same prefix, but it is also possible that some SIDs have the same one prefix, the other SIDs have the same another prefix. There may also be SIDs whose prefixes are different from those of other SIDs in the Segment List. The compression path in the example of the present disclosure refers to a path composed of continuous SIDs with the same prefix included in one Segment List.

For example, if all SIDs included in one Segment List have the same prefix, the forwarding path indicated by the Segment List is equivalent to one compression path; if the forwarding path indicated by one Segment List is SID1 to SID20, wherein SID1 to SID6 have the same prefix, SID8 to SID20 have the same prefix, then SID1 to SID6 is a compression path; SID8 to SID20 is another compression path; SID7 is not on any compression path. That is, one forwarding path includes two compression paths and SID7.

When the forwarding path is not equivalent to the compression path, the REPLACE-C-SID type also supports mixed scenarios. The next SID after the end of one compression path may be an uncompressed SID.

The uncompressed SID may be a normal SID or a boot SID of the next compression path, and the subsequent part of the boot SID is a plurality of C-SIDs of the next compression path. That is to say, the normal SID and the SID and C-SID in the compression path may exist in the same SRH at the same time, thus achieving the mixing effect.

In a mixed scenario and a pure compressed scenario with multiple compression paths, the Common Prefix of each compression path may be different, and the data plane (i.e. forwarding plane) of a node needs to identify the start and end of one compression path from the Segment List. REPLACE-C-SID flavor may be to identify whether the next SID in the Segment List is a C-SID.

For the two scenarios where the C-SID may be 32 bit and 16 bit, REPLACE-C-SID32 and REPLACE-C-SID16 are defined to distinguish the length of C-SID.

Figure 5B:
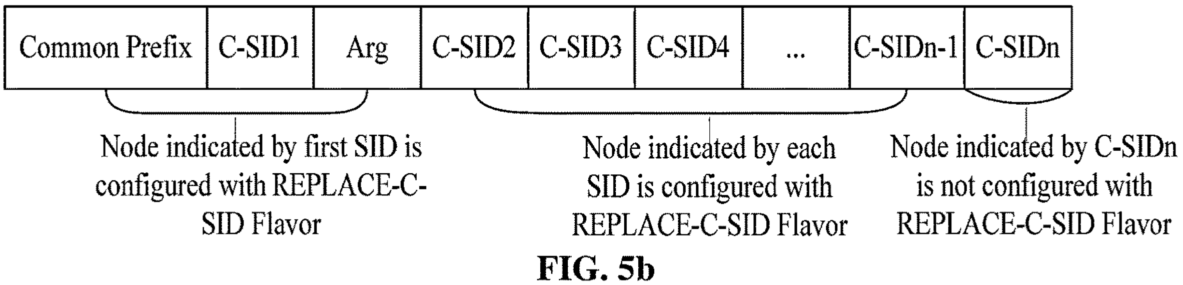
FIG. 5*b* is a schematic diagram of C-SID compression of another REPLACE-C-SID type provided by an example of the present disclosure.

As shown in FIG. 5*b*, the first SID at the beginning of the compression path is a complete 128-bits SID, consisting of Common Prefix, C-SID1 and Arg, occupying one C-SID container. The node 1 indicated by this SID is configured with replace-C-SID flavor, and one SID after this SID in the Segment List is identified as C-SID. The nodes indicated by C-SID2 to C-SIDn−1 need to be configured with REPLACE-C-SID flavor, the next SID is identified as C-SID. The node indicated by C-SIDn is not configured with REPLACE-C-SID flavor, which is to identify that a node indicated by C-SIDn is the last node on the compression path, and a next SID is the uncompressed SID.

If the next SID of C-SIDn in Segment List is the boot SID, a node indicated by the boot SID needs to be configured with Replace-C-SID flavor; if the next SID of the C-SIDn is a normal SID, a node indicated by the normal SID does not need to be configured with REPLACE-C-SID flavor.

Figure 5C:
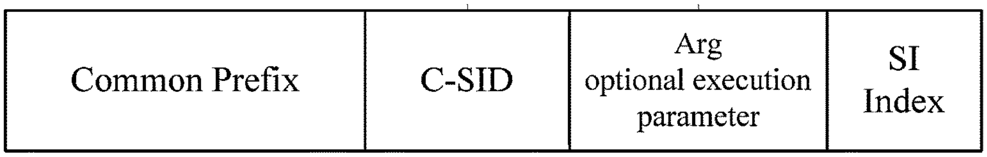
FIG. 5*c* is a schematic diagram of C-SID compression of another REPLACE-C-SID type provided by an example of the present disclosure.

When data plane processes messages, the location of the next SID may be located by the value of SL in SRH. However, in the compression path, only the C-SID container where the C-SID is located can be located through SL, and the location of the C-SID in the C-SID container needs to be further located. Therefore, a SID index (SI) field is newly defined, as shown in FIG. 5*c*, SI occupies the lowest bit of Arguments after C-SID in the destination address of IPV6 header. In 32 bits C-SID compression, SI is the lowest 2 bit of 128 bit SID. The value of SI field indicates the location of C-SID in C-SID container. For example, if the length of C-SID is 32 bits and a container may accommodate 4 c-SIDS, the value of SI field may be 0 to 3, which correspond to one C-SID respectively.

Figure 5D:
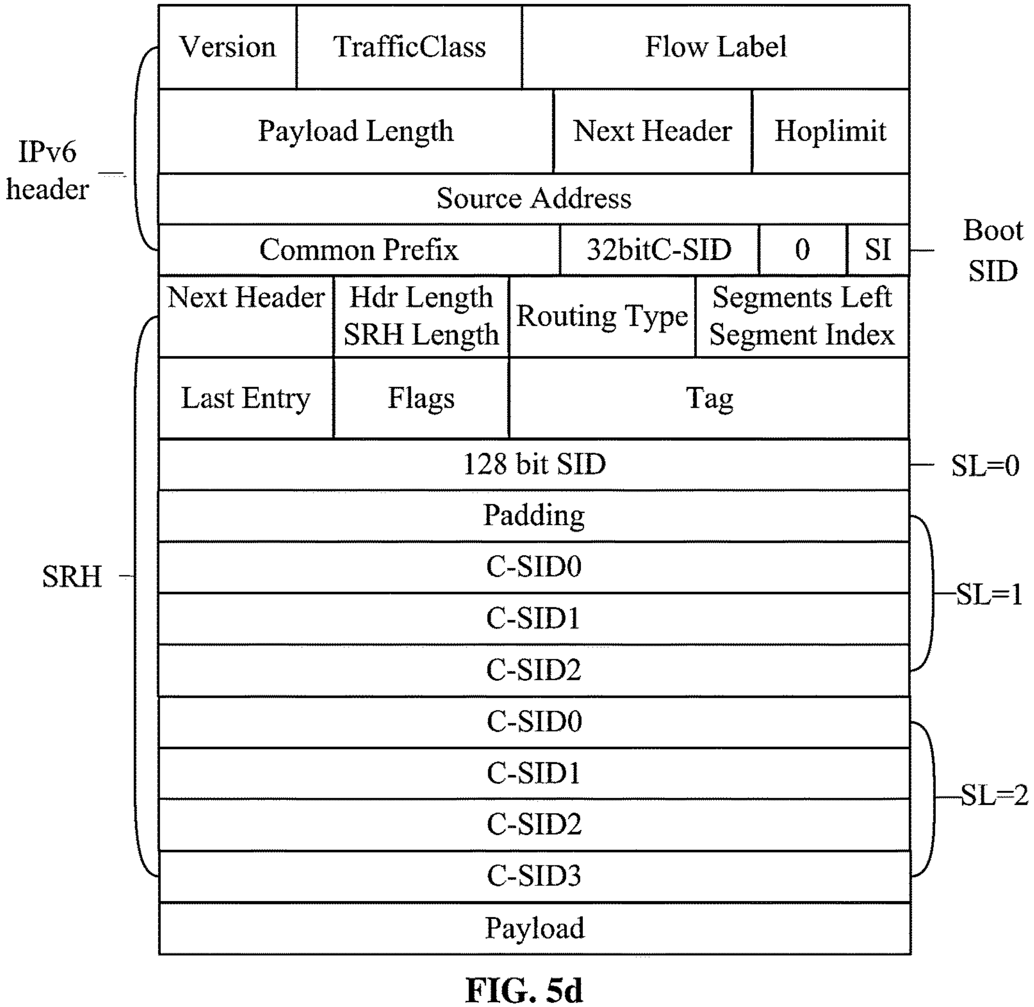
FIG. 5*d* is another IPv6 message format provided by an example of the present disclosure.

As shown in FIG. 5*d*, FIG. 5*d* is an IPV6 message format provided by an example of the present disclosure, wherein the destination address in the IPV6 header consists of a Common Prefix, a 32 bitC-SID, a 0 field and a SI field. Segment List of SRH includes a plurality of C-SIDS with a length of 32 bit.

The C-SID container indicated by SL=2 includes four C-SIDs: C-SID0, C-SID1, C-SID2 and C-SID3.

The C-SID container indicated by SL=1 includes three C-SIDs: C-SID0, C-SID1 and C-SID2, and since 128 bit are not completely occupied, it also includes a Padding field. SL-0 indicates an uncompressed SID.

Other parts in FIG. 5*d* are the same as those in FIG. 1, which can refer to the description of FIG. 1, which will not be repeated here.

When a node receives the message shown in FIG. 5*d*, it first obtains the value of SI from the destination address according to the locally configured REPLACE-C-SID flavor. If SI is 0, it means that the node is the last C-SID in the C-SID container indicated by the current SL, and the next C-SID container needs to be read. Therefore, the SL is decremented by 1, and the SI is initialized to 3, and the C-SID indicated by SL=3 in the next C-SID container is read.

For example, when the message is forwarded to a node indicated by C-SID0 in SL=2, the value of SI is 0. At this time, the node indicated by C-SID0 needs to decrement the SL value by 1 and initialize the SI value to 3, that is, read the C-SID 2 in SL=1; update the C-SID2 to the 32 bitC-SID of the destination address to obtain the address of the node indicated by C-SID2 in SL=1, and then forward the message to this node.

If SI is not 0, it means that the next C-SID needs to be read from the C-SID container indicated by the current SL, so SI needs to be decremented by 1. Update the read C-SID to the destination address.

For example, when the message is forwarded to a node indicated by C-SID2 in SL=2, the value of SI is 2, and the node indicated by C-SID2 needs to decrement SI by 1, read C-SID1 in SL=2, and update C-SID1 to 32 bitC-SID in the destination address to obtain the address of the node indicated by C-SID1 in SL=2, and then forward the message.

3. Mixed Type of NEXT-C-SID and REPLACE-C-SID

C-SIDs in multiple C-SID containers share one Block, as shown in FIG. 6, the Block is 32 bit, and each C-SID is 16 bit. One C-SID container may accommodate 8 C-SIDs or 1 Block and 6 C-SIDs, and the C-SIDs in FIG. 6 share one Block.

It can be understood that the SRH after compression and the segment list encapsulated in the SRH need to be used with the corresponding flavor, but the flavor is only configured in the control plane of each node, and the flavor is not carried in SRH.

In the SRv6 network adopting the above compression scheme, if a network failure occurs, and tools such as wireshark need to be used to capture the message to troubleshoot the fault path, the packet capture tool cannot determine the forwarding path according to the SRH in the captured message. Since wireshark can't know the Block length of each compression path in SRH and the flavor configured for each node, for the compressed SRH, the existing packet capture tool can't restore the segment list with complete SID offline. Wireshark is a network packet analysis software.

In another implementation scenario, each intermediate node in the SRv6 network will forward the message according to the forwarding path indicated by the Segment List of the SRH of the message. If the Segment List carries an uncompressed SID, when there is a faulty node in the forwarding path, if the upstream node of the faulty node finds that the next node is unreachable, it only needs to decrement SL by 1 to obtain one segment after the faulty node, and then it may skip the faulty node and directly send the message to the next node of the faulty node.

However, if the Segment List carries C-SID, the upstream node of the faulty node needs to know the flavor configured in the faulty node to obtain a next segment of the faulty node from the SRH. However, the upstream node of the faulty node cannot obtain the flavor configured in the faulty node, so a complete SID of a node after the faulty node cannot be recovered, which will lead to the failure of the intermediate node protection scheme.

In order to solve the above technical problems, an example of the present disclosure provides a method for message sending, which is applied to a network device. As shown in FIG. 7, the method includes:

S701, receiving a first message;

S702, sending a second message, wherein the second message includes a SRH and the first message, and wherein the SRH includes a plurality of C-SID containers and segment description information, and the segment description information includes a Block length, a C-SID length and a compression type of C-SID carried by each C-SID container.

The network device sends the second message, so that a device that receives the second message may restore the SID of each network device on the forwarding path from the C-SID container according to the segment description information.

The device that receives the second message may be a device on the forwarding path or a device may capture the second message.

After receiving the second message, the device on the forwarding path may use the segment description information carried by SRH to recover SID of a next node on the forwarding path, so as to forward the second message to the next node.

Or, after the device on the forwarding path receives the second message, if it is determined that the next node is a faulty node, it may recover SID of a next node of the faulty node through the segment description information carried by SRH, so as to skip the faulty node and directly forward the second message to the next node of the faulty node, thus realizing the intermediate node protection mechanism.

Or, after capturing the second message, the packet capture tool may restore the complete Segment List based on the segment description information, so as to troubleshoot the network failure based on the complete Segment List.

That is, the SRH of the second message may carry segment description information, which carries information for restoring the compressed SID to a complete SID. In this way, even if the device receiving the second packet is not configured with the flavor of the SID, it may recover the complete segment list carried by the SRH based on the segment description information carried in the second message.

According to the example of the present disclosure, since the SRH of the second message includes the segment description information, which includes the Block length, the C-SID length and the compression type of C-SID carried by each C-SID container, the packet capture tool may obtain the segment description information in the SRH after obtaining the second message, and according to the Block length, the C-SID length and the compression type of C-SID carried by each C-SID container in the segment description information, the packet capture tool may restore the C-SID in each C-SID container to a complete SID, and then obtain a complete segment list, which solves the problem that network troubleshooting cannot be performed because the complete segment list cannot be restored.

The first network device in the example of the present disclosure may be a head node, which may be configured by command line or Netconf in advance. Furthermore, when the head node encapsulates SRH for a message, if the segment list corresponding to SRv6 policy includes a compression path, the head node encapsulates segment description information in SRH to describe the structure of each segment.

In the example of the present disclosure, the SRH includes an extended Type-Length-Value (TLV) structure, and the extended TLV structure carries segment description information.

It can be understood that the SRH may include multiple C-SID containers, and accordingly, the segment description information may include container description information of each C-SID container.

As shown in FIG. 8, FIG. 8 is a schematic diagram of the extended TLV structure provided by the example of the present disclosure.

In FIG. 8, Type is TLV type, which identifies the TLV as a TLV (segment list Description TLV) for carrying segment description information, the specific value needs to be applied from the Internet Assigned Numbers Authority (IANA).

Length indicates the data field length of TLV, counted in bytes.

Part of Value is to carry segment description information, and Des0-DesN in FIG. 8 are N pieces of container description information included in the segment description information, and each piece of container description information occupies 1 byte.

Des0-DesN are the container description information of the corresponding C-SID container in the SRH segment list, Des0 is the container description information of the last C-SID container on the forwarding path indicated by the segment list, and correspondingly, DesN is the container description information of the first C-SID container on the forwarding path.

Among them, the extended TLV to carry segment description information requires 4-byte alignment. If the number of C-SID containers in the segment list of SRH that actually needs to be described does not meet the alignment condition, Padding TLVs can be used for alignment.

The above segment description information includes container description information of each C-SID container, and each piece of container description information includes a first field, a second field and a third field. The length of each piece of container description information is 1 byte, and 2 bits of the container description information carry the first field, 1 bit of the container description information carries the second field, 3 bits of the container description information carry the third field, and 2 bits of the container description information are a reserved field.

Figure 9:
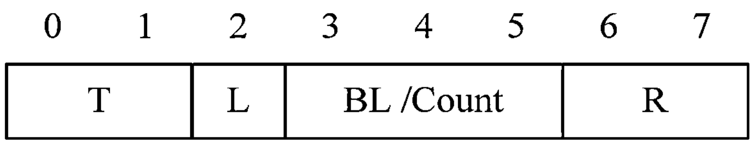
FIG. 9 is a schematic structural diagram of container description information provided by an example of the present disclosure.

As shown in FIG. 9, FIG. 9 is a schematic structural diagram of container description information provided by an example of the present disclosure, that is, a schematic diagram of a Des in FIG. 8. In FIG. 9, T is the first field, L is the second field, BL/Count is the third field, and R is the reserved field.

Among then, a value of the first field is to represent the compression type of the C-SID carried by the C-SID container;

- a value of the second field is to represent the C-SID length;
- a value of the third field is to represent the Block length of a Block or the number of C-SIDs included in the C-SID container;
- when the third field is to represent the Block length of the Block included in the C-SID container, the third field is selected from multiple values, and each of the values is to represent a specified Block length.

The specific values of the first field, the second field and the third field in each piece of container description information are introduced below.

The first field is selected from four values, which respectively represent a first compression type, a second compression type, a third compression type and a fourth compression type:

- the first compression type is uncompressed; uncompressed means that the container contains a complete 128 bit SID;
- the second compression type is compression of a NEXT-C-SID type;
- the third compression type is an starting SID of a compression path of a REPLACE-C-SID type; the starting SID is a complete SID of a first device on the compression path;
- the fourth compression type is a non-starting SID of a compression path of a REPLACE-C-SID type or a mixed type; the non-starting SID is a C-SID of another device except the first device on the compression path;
- wherein the mixed type is a mixed type of the NEXT-C-SID type and the REPLACE-C-SID type.

Combined with the introduction of REPLACE-C-SID in the above example, the forwarding path of the second message may span multiple network segments, so when compressing the SID in the segment list, it will be compressed by segments. A path indicated by a continuous SID with a common prefix on the forwarding path can be taken as a compression path, and the forwarding path indicated by the segment list may include multiple compression paths.

The four values included in the first field (T) may be 00, 01, 10 and 11.

When the value of the first field is 00, it indicates the first compression type: uncompressed.

When the value of the first field is 01, it indicates the second compression type: compression of NEXT-C-SID type.

When the value of the first field is 10, it indicates the third compression type: the starting SID of the compression path of the REPLACE-C-SID type.

When the value of the first field is 11, it indicates the fourth compression type: the non-starting SID of the compression path of the REPLACE-C-SID type or the mixed type.

Taking FIG. 4*a*, FIG. 5*a* and FIG. 6 as examples, the value of the T field of container description information corresponding to the C-SID container shown in FIG. 4*a* is 01, indicating that the compression type of the C-SID container is compression of NEXT-C-SID type.

In FIG. 5*a*, the value of the T field of the container description information of the C-SID container to which C-SID1 belongs is 10, indicating the compression type of the container to which C-SID1 belongs is the starting SID of the compression path of the REPLACE-C-SID type.

In FIG. 5*a*, the value of the T field of the container description information of the C-SID container to which C-SID2 to C-SID5 belong is 11, indicating that the compression type of the C-SID container is the non-starting SID of the compression path of the REPLACE-C-SID type.

In FIG. 6, the value of the T field of the container description information of the C-SID containers to which C-SID1 to C-SID6 belong is 11, indicating that the compression type of the C-SID container is the non-starting SID of the compression path of the mixed type.

In this way, the network device receiving the second message may obtain the compression type of each C-SID through the value of the first field.

In addition, the second field (L) may be selected from two values, and when the value of the second field is a first value, it indicates that the C-SID length is 16 bits; when the value of the second field is a second value, it indicates that the C-SID length is 32 bits.

For example, the first value may be 0 and the second value may be 1.

As such, the network device receiving the second message may determine the C-SID length according to the value of the second field, and recover the complete SID according to the length of the C-SID.

In the example of the present disclosure, the first field and the second field may be used together, and when the value of the first field indicates the second compression type or the third compression type, the third field is used to indicate the Block length (BL) included in the C-SID container.

That is, if the value of the T field in FIG. 9 is 01 or 10, 3-5 bit in FIG. 9 is used as the BL field.

It can be understood that since the C-SID containers of the second compression type and the third compression type both include Block, the third field may be used to indicate the Block length of the Block included in the C-SID containers.

Taking FIG. 4*a* as an example, the value of the first field of the container description information of the C-SID container shown in FIG. 4*a* is 01, and the compression type of the C-SID container is the second compression type, that is, the C-SID container carries the starting SID of the compression path, and the third field of the container description information indicates the Block length of the starting SID in the C-SID container.

When the third field is to indicate the Block length of the Block included in the C-SID container, the third field includes multiple values, and each value is to indicate a specified Block length.

For example, at present, the Block length is selected from 7 values, and correspondingly, the third field may be selected from 7 values, namely 000, 001, 010, 011, 100, 110 and 111.

When the value of BL is 000, it indicates that the Block length is 16 bits.

When the value of BL is 001, it indicates that the Block length is 32 bits.

When the value of BL is 010, it indicates that the Block length is 48 bits.

When the value of BL is 011, it indicates that the Block length is 56 bits.

When the value of BL is 100, it indicates that the Block length is 64 bits.

When the value of BL is 110, it indicates that the Block length is 72 bits.

When the value of BL is 111, it indicates that the Block length is 80 bits.

It should be noted that the value of the third field may be set according to the actual Block length, and it is not limited to the above seven values, for example, it may also be set to 5 values according to actual needs, which is not limited by the example of the present disclosure.

In addition, when the compression type indicated by the first field is the fourth compression type, the third field is to indicate the number of C-SIDs included in the C-SID container.

That is, when the value of the T field is 11, all C-SIDs are in the C-SID container, and 3-5 bit in FIG. 9 is used as the Count field to indicate the number of C-SIDs included in the C-SID container.

Taking FIG. 5*a* as an example, if the compression type of the C-SID container shown in FIG. 5*a* is the non-starting SID of the compression path of REPLACE-C-SID, the Count field of the container description information of the C-SID container is to indicate that the C-SID container includes four C-SIDs.

It should be noted that when the value of the first field is 01, indicating the second compression type, the network device receiving the second message may calculate the number of C-SIDs included in the C-SID container according to the C-SID length indicated by the second field, the Block length indicated by the third field and the non-zero field length of the Argument field.

Taking FIG. 4*b* as an example, the compression type of the C-SID container shown in FIG. 4*b* is: compression of the NEXT-C-SID type, the C-SID length is 16 bit, and the Block length is 32 bit, so it can be determined that the total length of the Argument field is 128 bit-16 bit-32 bit=80 bit. The device may recognize that the length of the field in which the lower bits of the Argument field in FIG. 4*b* are successively set to 0 is 16 bit. Furthermore, it is calculated that the length of the non-zero field in the Argument field is 80 bit-16 bit=64 bit, and then it is calculated that the Argument field includes 64/16=4 C-SIDs, plus the current effective C-SID, that is, the C-SID container includes 5 C-SIDs.

When the value of the first field is 10, which indicates the third compression type: the starting SID of the compression path of the REPLACE-C-SID type, the network device receiving the second message may directly determine that the number of C-SIDs is only one.

Therefore, when the value of T field of container description information is 01 or 10, the container description information does not need to carry the number of C-SIDs, so the 3-5 bit of container description information does not conflict with each other and can be shared by BL field and count field, which can reduce the occupation of SRH field.

In this way, the network device receiving the second message may determine the Block length or the number of C-SIDs according to the value of the third field.

Figure 10:
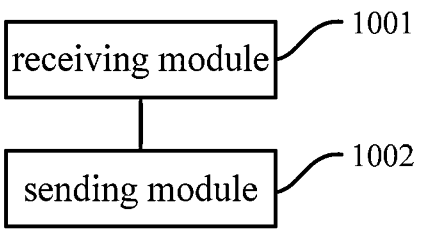
FIG. 10 is a schematic structural diagram of a message sending apparatus provided by an example of the present disclosure.

Based on the same inventive concept, an example of the present disclosure also provides a message sending apparatus, which is applied to network device. As shown in FIG. 10, the apparatus includes:

a receiving module 1001 to receive a first message;

a sending module 1002 to send a second message, wherein the second message includes a segment routing header SRH and the first message, and wherein the SRH includes a plurality of compressed segment identifier C-SID containers and segment description information, and the segment description information includes a Block length, a C-SID length and a compression type of C-SID carried by each C-SID container.

In an example, the segment description information includes container description information of each C-SID container, and each piece of container description information includes a first field, a second field and a third field;

wherein the value of the first field is to represent the compression type of the C-SID carried by the C-SID container;

the value of the second field is to represent the C-SID length;

the value of the third field is to represent the Block length or the number of C-SIDs included in the C-SID container;

when the third field is to represent the Block length of the Block included in the C-SID container, the third field includes multiple values, and each of values is to represent a specified Block length.

In an example, the first field is selected from four values, which respectively represent a first compression type, a second compression type, a third compression type and a fourth compression type:

the first compression type is uncompressed;

the second compression type is compression of a NEXT-C-SID type;

the third compression type is an starting SID of a compression path of a REPLACE-C-SID type;

the fourth compression type is a non-starting SID of a compression path of a REPLACE-C-SID type or a mixed type;

wherein the mixed type is a mixed type of the NEXT-C-SID type and the REPLACE-C-SID type, and the starting SID is a complete SID of the first device on the compression path.

In an example, when the value of the second field is a first value, it indicates that the C-SID length is 16 bits;

when the value of the second field is a second value, it indicates that the C-SID length is 32 bits.

In an example, when the value of the first field represents the second compression type or the third compression type, the third field is to represent the Block length of the Block included in the C-SID container;

when the value of the first field represents the fourth compression type, the third field is to represent the number of C-SIDs included in the C-SID container.

In an example, the length of each piece of container description information is 1 byte, and 2 bits of the container description information carry the first field, 1 bit of the container description information carries the second field, 3 bits of the container description information carry the third field, and 2 bits of the container description information are a reserved field.

In an example, the SRH includes an extended TLV structure, which carries the segment description information.

Figure 11:
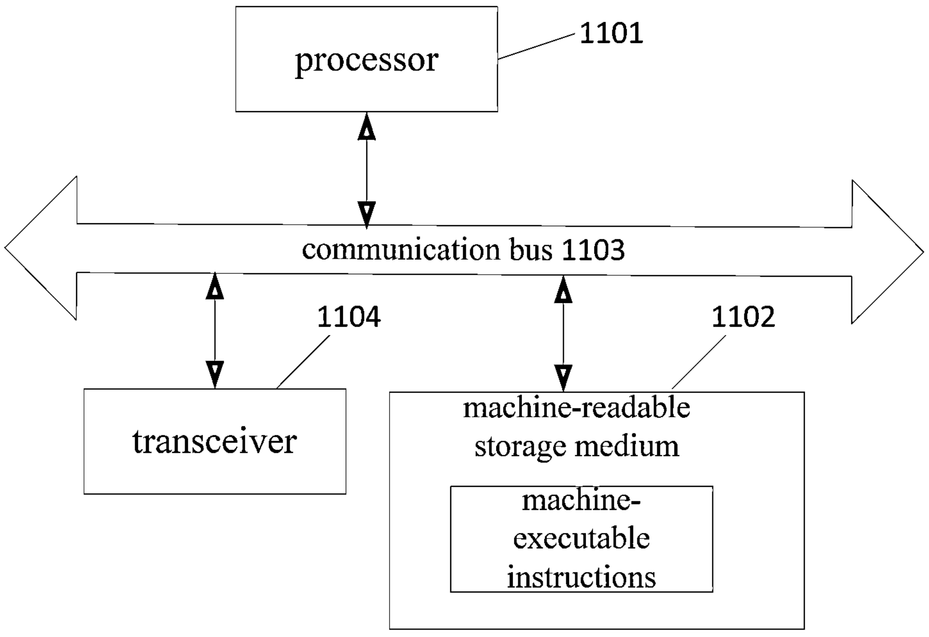
FIG. 11 is a schematic structural diagram of an electronic device provided by an example of the present disclosure.

An example of the present disclosure also provides a network device, as shown in FIG. 11, the network device includes:

a processor 1101;

a transceiver 1104;

a machine-readable storage medium 1102 storing machine-executable instructions that can be executed by the processor, wherein the machine-executable instructions cause the processor 1101 to perform the following operations:

receiving a first message by the transceiver 1104;

sending a second message by the transceiver 1104, wherein the second message includes a segment routing header SRH and the first message, and wherein the SRH includes a plurality of compressed segment identifier C-SID containers and segment description information, and the segment description information includes a Block length, a C-SID length and a compression type of C-SID carried by each C-SID container.

In an example, the segment description information includes container description information of each C-SID container, and each piece of container description information includes a first field, a second field and a third field;

wherein the value of the first field is to represent the compression type of the C-SID carried by the C-SID container;

the value of the second field is to represent the C-SID length;

the value of the third field is to represent the Block length or the number of C-SIDs included in the C-SID container;

when the third field is to represent the Block length of the Block included in the C-SID container, the third field includes multiple values, and each of the values is to represent a specified Block length.

In an example, the first field is selected from four values, which respectively represent a first compression type, a second compression type, a third compression type and a fourth compression type:

the first compression type is uncompressed;

the second compression type is compression of a NEXT-C-SID type;

the third compression type is an starting SID of a compression path of a REPLACE-C-SID type;

the fourth compression type is a non-starting SID of a compression path of a REPLACE-C-SID type or a mixed type;

wherein the mixed type is a mixed type of the NEXT-C-SID type and the REPLACE-C-SID type, and the starting SID is a complete SID of the first device on the compression path.

In an example, when the value of the second field is a first value, it indicates that the C-SID length is 16 bits;

when the value of the second field is a second value, it indicates that the C-SID length is 32 bits.

In an example, when the value of the first field represents the second compression type or the third compression type, the third field is to represent the Block length of the Block included in the C-SID container;

when the value of the first field represents the fourth compression type, the third field is to represent the number of C-SIDs included in the C-SID container.

In an example, the length of each piece of container description information is 1 byte, and 2 bits of the container description information carry the first field, 1 bit of the container description information carries the second field, 3 bits of the container description information carry the third field, and 2 bits of the container description information are a reserved field.

In an example, the SRH includes an extended TLV structure, which carries the segment description information.

As shown in FIG. 11, the network device may also include a communication bus 1103. The processor 1101, the machine-readable storage medium 1102 and the transceiver 1104 communicate with each other through the communication bus 1103, which may be a peripheral component interconnect (PCI) bus or an extended industry standard architecture (EISA) bus. The communication bus 1103 may be divided into address bus, data bus, control bus, etc.

The transceiver 1104 may be a wireless communication module, and the transceiver 1104 performs data interaction with other devices under the control of the processor 1101.

The machine-readable storage medium 1102 may include a Random Access Memory (RAM) or a Non-Volatile Memory (NVM), such as at least one disk memory. In addition, the machine-readable storage medium 1102 may also be at least one storage device located far away from the aforementioned processor.

The processor 1101 may be a general-purpose processor, including a Central Processing Unit (CPU), a Network Processor (NP), etc. It can also be a Digital Signal Processing (DSP), an Application Specific Integrated Circuit (ASIC), a Field-Programmable Gate Array (FPGA) or other programmable logic devices, discrete gate or transistor logic devices, and discrete hardware components.

Based on the same inventive concept, according to the above method for message sending provided by the example of the present disclosure, an example of the present disclosure also provides a machine-readable storage medium, which stores machine-executable instructions that can be executed by a processor. The processor is caused by the machine-executable instructions to implement any of the above method for message sendings.

In yet another example of the present disclosure, there is also provided a computer program product including instructions, which, when run on a computer, causes the computer to execute any of the method for message sendings in the above examples.

It should be noted that the relationship terms use here, such as "first", "second" and the like are only to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

The examples described above are only preferred examples of the present disclosure, and are not intended to limit the scope of protection of the present disclosure. Any modifications, equivalent replacement, improvement made within the spirit and principle of the present disclosure shall be included in the scope of protection of the present disclosure.

What is claimed is:

1. A method for message sending, which is applied to a network device, the method comprising:

receiving a first message;

sending a second message, wherein the second message comprises a segment routing header SRH and the first message, and wherein the SRH comprises a plurality of compressed segment identifier C-SID containers and segment description information, and the segment description information comprises a Block length, a C-SID length and a compression type of C-SID carried by each C-SID container, wherein:

the segment description information comprises container description information of each C-SID container, and each piece of container description information comprises a first field, a second field and a third field;

a value of the first field is to represent the compression type of the C-SID carried by the C-SID container;

a value of the second field is to represent the C-SID length;

a value of the third field is to represent the Block length of a Block or the number of C-SIDs included in the C-SID container; and when the third field is to represent the Block length of the Block included in the C-SID container, the third field is selected from multiple values, and each of the values is to represent a specified Block length.

2. The method according to claim 1, wherein, the first field is selected from four values, which respectively represent a first compression type, a second compression type, a third compression type and a fourth compression type:

the first compression type is uncompressed;

the second compression type is compression of a NEXT-C-SID type;

the third compression type is an starting SID of a compression path of a REPLACE-C-SID type;

the fourth compression type is a non-starting SID of a compression path of a REPLACE-C-SID type or a mixed type;

wherein the mixed type is a mixed type of the NEXT-C-SID type and the REPLACE-C-SID type, and the starting SID is a complete SID of a first device on the compression path.

3. The method according to claim 1, wherein, when the value of the second field is a first value, it indicates that the C-SID length is 16 bits;

when the value of the second field is a second value, it indicates that the C-SID length is 32 bits.

4. The method according to claim 2, wherein, when the value of the first field represents the second compression type or the third compression type, the third field is to represent the Block length of the Block included in the C-SID container;

when the value of the first field represents the fourth compression type, the third field is to represent the number of C-SIDs included in the C-SID container.

5. The method according to claim 1, wherein a length of each piece of container description information is 1 byte, and 2 bits of the container description information carry the first field, 1 bit of the container description information carries the second field, 3 bits of the container description information carry the third field, and 2 bits of the container description information are a reserved field.

6. The method according to claim 1, wherein the SRH comprises an extended TLV structure, which carries the segment description information.

7. A non-transitory machine-readable storage medium having stored therein machine-executable instructions, which, when called and executed by a processor, cause the processor to implement the method of claim 1.

8. A network device, wherein the network device comprises:

a processor;

a transceiver;

a machine-readable storage medium storing machine-executable instructions that can be executed by the processor, wherein the machine-executable instructions cause the processor to perform the following operations:

receiving a first message by the transceiver;

sending a second message by the transceiver, wherein the second message comprises a segment routing header SRH and the first message, and wherein the SRH comprises a plurality of compressed segment identifier C-SID containers and segment description information, and the segment description information comprises a Block length, a C-SID length and a compression type of C-SID carried by each C-SID container, wherein:

the segment description information comprises container description information of each C-SID container, and each piece of container description information comprises a first field, a second field and a third field;

a value of the first field is to represent the compression type of the C-SID carried by the C-SID container;

a value of the second field is to represent the C-SID length;

a value of the third field is to represent the Block length of a Block or the number of C-SIDs included in the C-SID container; and when the third field is to represent the Block length of the Block included in the C-SID container, the third field is selected from multiple values, and each of the values is to represent a specified Block length.

9. The network device according to claim 8, wherein, the first field is selected from four values, which respectively represent a first compression type, a second compression type, a third compression type and a fourth compression type:

the first compression type is uncompressed;

the second compression type is compression of a NEXT-C-SID type;

the third compression type is an starting SID of a compression path of a REPLACE-C-SID type;

the fourth compression type is a non-starting SID of a compression path of a REPLACE-C-SID type or a mixed type;

wherein the mixed type is a mixed type of the NEXT-C-SID type and the REPLACE-C-SID type, and the starting SID is a complete SID of a first device on the compression path.

10. The network device according to claim 8, wherein, when the value of the second field is a first value, it indicates that the C-SID length is 16 bits;

when the value of the second field is a second value, it indicates that the C-SID length is 32 bits.

11. The network device according to claim 9, wherein, when the value of the first field represents the second compression type or the third compression type, the third field is to represent the Block length of the Block included in the C-SID container;

when the value of the first field represents the fourth compression type, the third field is to represent the number of C-SIDs included in the C-SID container.

12. The network device according to claim 8, wherein a length of each piece of container description information is 1 byte, and 2 bits of the container description information carry the first field, 1 bit of the container description information carries the second field, 3 bits of the container description information carry the third field, and 2 bits of the container description information are a reserved field.

13. The network device according to claim 8, wherein the SRH comprises an extended TLV structure, which carries the segment description information.

* * * * *